(12) United States Patent
Zhu et al.

(10) Patent No.: US 10,941,802 B2
(45) Date of Patent: Mar. 9, 2021

(54) INTELLIGENT WASHER

(71) Applicants: Shengbo Zhu, San Jose, CA (US); Su Shiong Huang, Bellevue, WA (US)

(72) Inventors: Shengbo Zhu, San Jose, CA (US); Su Shiong Huang, Bellevue, WA (US)

(73) Assignee: SILICON VALLEY MICRO E CORP., San Jose, CA (US)

( * ) Notice: Subject to any disclaimer, the term of this patent is extended or adjusted under 35 U.S.C. 154(b) by 547 days.

(21) Appl. No.: 14/545,979

(22) Filed: Jul. 13, 2015

(65) Prior Publication Data

US 2017/0016469 A1    Jan. 19, 2017

(51) Int. Cl.
| | |
|---|---|
| *B25B 23/142* | (2006.01) |
| *F16B 31/02* | (2006.01) |
| *G06K 19/077* | (2006.01) |
| *G06K 19/07* | (2006.01) |
| *F16B 43/00* | (2006.01) |
| *B25B 21/00* | (2006.01) |
| *B25B 23/14* | (2006.01) |

(52) U.S. Cl.
CPC ............ *F16B 31/028* (2013.01); *B25B 21/00* (2013.01); *B25B 23/14* (2013.01); *B25B 23/1425* (2013.01); *F16B 43/00* (2013.01); *G06K 19/0716* (2013.01); *G06K 19/0775* (2013.01); *G06K 19/07758* (2013.01); *F16B 43/004* (2013.01)

(58) Field of Classification Search
CPC ...... F16B 31/028; F16B 43/00; F16B 43/004; B25B 21/00; B25B 23/14; B25B 23/1425; B25B 9/00; B25B 13/48; G06K 19/0716; G06K 19/0775; G06K 19/07758; H01R 11/15; H01R 11/14; H02G 1/02
See application file for complete search history.

(56) References Cited

U.S. PATENT DOCUMENTS

| | | | | |
|---|---|---|---|---|
| 3,060,731 A | * | 9/1958 | Adise ...................... | F16B 31/02 73/862.636 |
| 3,186,217 A | * | 6/1965 | Pfann .................... | B23Q 15/00 257/417 |

(Continued)

*Primary Examiner* — Joseph J Hail
*Assistant Examiner* — Arman Milanian

(57) ABSTRACT

An intelligent fastener unit for fastening together structural members. The fastener unit includes a fastener with an externally threaded shank, an internally threaded mating member for threaded engagement with the fastener, and an intelligent washer having an RFID tag and an antenna mounted on one surface of a centrally aperture body member, and a pressure sensor mounted on the opposite surface for generating electrical signals representative of the compressive force applied to structural members captured by the fastener, the mating member and the washer. An air gap is formed in the washer body member between the outer periphery and the central aperture to reduce eddy current formation when the RFID tag is interrogated by an RFID tag reader using r.f. signaling. The RFID tag has a memory containing information specific to the fastener unit—such as fastener unit identification, specified torque value and other information Once installed, the existing torque on a collection of fastener units is measured by using the RFID tag reader to scan the information stored in the memory of each fastener unit washer.

23 Claims, 7 Drawing Sheets

(56) References Cited

U.S. PATENT DOCUMENTS

| | | | |
|---|---|---|---|
| 6,250,863 B1 * | 6/2001 | Kamentser | F16B 31/00 411/10 |
| 6,378,384 B1 * | 4/2002 | Atkinson | G01L 1/2231 73/862.474 |
| 7,698,949 B2 * | 4/2010 | Akdeniz et al. | G01L 5/243 |
| 7,786,864 B1 * | 8/2010 | Shostak | B60C 23/041 340/539.1 |
| 8,013,744 B2 * | 9/2011 | Tsai | G06K 19/0717 235/439 |
| 8,887,585 B2 * | 11/2014 | Furniss | G01L 1/20 73/862 |
| 8,893,557 B2 * | 11/2014 | Mekid | G01L 5/0038 73/761 |
| 9,417,142 B2 * | 8/2016 | Ichige | G01L 1/2231 |
| 9,483,674 B1 * | 11/2016 | Fink | G06K 7/10366 |
| 9,978,190 B2 * | 5/2018 | Lopes | B60B 3/142 |
| 2005/0284231 A1 * | 12/2005 | Zimmerman et al. | G01L 1/14 |
| 2006/0022056 A1 * | 2/2006 | Sakama et al. | G06K 19/04 |
| 2007/0017295 A1 * | 1/2007 | Ohta | F16B 31/02 73/761 |
| 2010/0054891 A1 * | 3/2010 | Nishida | B25B 23/14 411/9 |
| 2010/0289647 A1 * | 11/2010 | Rudduck et al. | F16B 1/0071 |
| 2012/0198941 A1 * | 8/2012 | Smith | F16B 31/028 |
| 2013/0186951 A1 * | 7/2013 | Zhu | F16B 31/02 235/375 |
| 2014/0079504 A1 * | 3/2014 | Wols | F16B 31/02 |
| 2014/0129158 A1 * | 5/2014 | Shea | G01L 5/243 702/57 |
| 2014/0130609 A1 * | 5/2014 | Smith | F16B 37/0857 73/862.21 |
| 2016/0245709 A1 * | 8/2016 | Pagani et al. | G01L 1/18 |

\* cited by examiner

INTELLIGENT WASHER

BACKGROUND OF THE INVENTION

This invention relates to threaded fasteners and mating nuts. More particularly, this invention relates to industrial threaded fasteners and mating nuts having intelligent properties.

Threaded fasteners have long been used to fasten together myriad types of mechanical parts. Some examples of the different types of mechanical parts which can be fastened together by threaded fasteners are structural members, such as bridge girders, support beams in buildings, and aircraft structural members. Typically, during installation each threaded fastener is inserted into an aperture in the piece to be captured and threaded into a designated portion of the mating piece, such as a nut secured to, or a threaded aperture formed in, the mating piece. In many applications, each fastener must be threadably tightened to a specific torque amount within a narrow band of specified tolerances. The specified tolerances are usually part of the specifications created for a given project, and may be presented in paper form or in electronic form (such as stored in a flash drive or other computer-readable memory) for use with a portable computer which can be transported to the job site. Both manual torque wrenches and power driven torque tools are typically used to tighten the fastener to a value lying within the specified torque range. Typically, the installer must consult the specifications in order to determine the proper range of permissible torque values, and then tighten the fastener. Ideally, the installer would manually create a record of each installed fastener by site location and torque value and submit such record to an inspector or other person or office responsible for maintaining project data. However, this is not always done.

Many projects require that the installed fasteners be checked for proper torque value immediately after installation, and later on a regular basis, in order to ensure the safety of the entire structural assembly. This inspection and check must be performed by a qualified person (usually a trained inspector) having an authentic copy of the original specifications, and is usually done manually by the inspector with a torque wrench, a power driven torque tool or a torque measurement device applied to each installed fastener. In addition, the inspector typically conducts a visual survey to determine whether any fasteners are missing. The results of the inspection and check must be reported to the designated person or office which maintains the inspection records for future reference.

Because the inspection process must be manually and visually performed on each individual fastener, the process is very time consuming and subject to human error—e.g., by failing to correctly apply the proper torque specification value to one or more fasteners, failure to accurately measure the torque on a given fastener or failure to notice the absence of a fastener from a designated fastener site. In addition, as noted above, a record of the initial installation of fasteners is not always created to the detriment of those responsible for maintaining the integrity and safety of fastened structures.

Commonly assigned U.S. Pat. No. 8,584,957 issued Nov. 19, 2013 for "Intelligent Fastener", the disclosure of which is hereby incorporated by reference, discloses a threaded fastener with intelligent properties which facilitates fastener installation and follow-up checking, and an intelligent fastener system and method which affords hitherto unavailable advantages to the installation and follow-on monitoring of structures fastened together using threaded fasteners. More particularly, the threaded fastener comprises a body member having a head portion and a shank portion extending from the head portion, the shank portion having a threaded outer surface. The head portion of the fastener body member has a lower surface and an upper surface and a throughbore formed therethrough and laterally offset outwardly of the threaded outer surface. The upper surface of the head portion of the fastener body member has a recess formed therein to accommodate an RFID tag, an antenna coupled to the RFID tag, and a sensor having a body portion mounted in the recess and coupled to the RFID tag. The sensor has an arm portion extending away from the sensor body portion and terminating in a free end, the arm portion being slidably received in the throughbore outwardly of the threaded outer surface of the shank portion of the fastener body member. The free end of the arm portion extends below the lower surface of the head portion of the fastener body member so that the free end of the arm contacts the surface of a workpiece having an aperture. When the shank portion of the fastener is inserted into the workpiece aperture, the arm is translated along the throughbore towards the head portion of the fastener body member as the shank portion advances into the aperture of the workpiece.

The RFID tag has a memory for storing information specific to the fastener, such as a unique identification for the fastener, a torque value specified for the fastener, an installation date for the fastener, a site location at which the fastener is installed, and a date of inspection for the fastener. The fastener identification and specified torque value information can be stored in the RFID tag memory when the fastener is ready for deployment in the field, while the remaining information can be stored in the RFID tag memory when the fastener is actually installed. This is done by means of an RFID tag reader capable of interrogating the RFID tag, receiving information from the RFID tag, and having a transmitter for storing new and revised information in the memory of the RFID tag.

A fastener installation tool is used to drive a given fastener into a threaded aperture to a specified torque value. The fastener installation tool includes a torque control unit coupled to the RFID tag reader for limiting the torque applied by the fastener installation tool to the fastener to the torque value read from the RFID tag memory by the RFID tag reader.

For initial installation of a fastener, the RFID tag reader is placed in the vicinity of and within the reception range of the fastener RFID tag. The RFID tag reader is then operated to generate an interrogation signal directed to the fastener RFID tag. Upon receipt of the interrogation signal, the RFID tag of the fastener responds by transmitting the requested information to the RFID tag reader. The RFID tag reader then examines the received information, which will include the unique identification of the fastener and the desired torque value for that fastener. The RFID tag reader next supplies the desired torque value to the torque control unit. When the torque value is received, the torque control unit uses this torque value to control the operation of the power driver unit. A driver bit is maneuvered onto the head of the fastener and the power driver unit is activated. As the driver bit is rotated by the power driver unit, the fastener is driven into the threaded aperture of a structural member, drawing the structural members to be secured together until the torque control unit senses that the torque exerted on the fastener has reached the specified value. Operation of the power driver unit is then terminated by the torque control unit. The RFID tag reader then interrogates the RFID tag of the fastener and transmits the installation date to the RFID tag, which stores this information in memory.

After initial installation, the actual torque value of the now-installed fastener can be checked by operating the RFID tag reader to interrogate the RFID tag of the fastener. When a response is received by the RFID tag reader, the received information will include the unique identification of the fastener, the desired torque value for that fastener, and the state of the sensor. If the state of the sensor indicates that the torque value is not correct, the initial installation process can be repeated until the torque value is correct. If the initial installation process fails after one or more attempts, the installer may take elective action to determine the cause of the failure, such as examining the fastener and replacing it if found to be defective, examining the threaded aperture of the structural member and determining whether it is damaged.

After the installation process has been successfully concluded, the information received by the RFID tag reader from the RFID tag of the now-installed fastener may be transmitted to a host computer for further processing and/or storage for later retrieval. This information will normally include the unique identification of the fastener, the desired torque value, whether the torque value of the fastener is within the specification value, the installation date and (optionally) time of day and the site location of the fastener. At any stage of the installation process, the information received by the RFID tag reader may be transmitted to the host computer for further processing and/or storage for later retrieval. Similarly, the host computer may send data and instructions to the RFID tag reader to update the data in the RFID tag, perform certain data retrieval operations from the RFID tag, or take other action such as scanning a collection of RFID tags located in different fasteners.

Once a collection of fasteners 10 has been successfully installed, the integrity of the installation can be quickly checked at any time using a scanning inspection technique. Normally, this scanning inspection process will be carried out by an inspector having more specialized training than a fastener installer. Also, the first scanning inspection will normally be conducted shortly after the entire installation is completed or the installation of a predetermined set of fasteners has been completed. A portable RFID tag reader having the capability of interrogating the individual RFID tags carried by an array of installed individual fasteners is manually scanned in a given direction across the array. Preferably, the RFID tag reader has an antenna defining a transmission/reception area which encompasses a plurality of fasteners so that several fasteners may be scanned at the same time. Each responding fastener supplies the requested information to the RFID tag reader, and this information can be displayed to the inspector using a dedicated display incorporated into the RFID tag reader or a portable computer monitor.

The requested information will normally include the unique identification for each fastener responding to the interrogation signals generated by the RFID tag reader, the physical location of each responding fastener on the structural member in which the fasteners are installed, the status of the sensor, and the original installation date. If no response is received to an interrogation of a given fastener, this may signify that a fastener is currently missing or that the intelligent circuit components are inoperative. Either condition can be fixed at once or at a later scheduled date by simply replacing the missing or inoperative fastener. If the information received from a responding fastener indicates that the torque is out of specification value, the inspector can use the installation tool described above to attempt to correct this problem. All information received by the RFID tag reader can be shared with the host computer and used for maintenance, history and any other appropriate purposes. The RFID tag reader also transmits the inspection date and site location to each successfully interrogated RFID tag 17, which stores this information in memory.

The basic type of information which can be stored in the RFID tag in a fastener includes the identification of the particular fastener, which may be a serial number in a series of numbers or a combination of distinct characters in a collection of characters; the type designation of the fastener; the specified torque value for the fastener; the installation location of the fastener; the original installation date; and the date of the most recent inspection. Other types of information may be also be stored in the RFID tag depending on the requirements of a given application.

Threaded fasteners with intelligent components incorporating the invention of the '957 patent afford several advantages over known threaded fasteners. Firstly, initial installation of a fastener to the correct torque specification is greatly facilitated by providing the correct torque information in the fastener RFID tag in a form which can be extracted by the installation tool when the installer is prepared to install the fastener. In addition, the fastener can be automatically driven to the proper torque value by the installation tool, and the torque value can be checked immediately after the fastener is installed to ensure that the fastener is correctly installed. Moreover, the integrity of the installation of a collection of fasteners can be quickly checked at any time using the scanning inspection technique, and any needed corrective action can be taken using the installation tool. Further, the scanning inspection technique avoids the need to manually check the current value of each installed fastener, which substantially reduces the time required for the inspection process to be conducted. Also, the provision of the fastener identification, type, specified torque value, site location, installation date and inspection date information in the fastener in a form readable by the associated tag reader enables a complete history of the fastener installation project to be compiled and saved in a host computer for future maintenance purposes. Lastly, the above advantages are all afforded at relatively low additional cost per fastener.

While the '957 fastener system provides a substantial advance in the structural fastener art, there are certain limitations to the design. For example, each fastener must be installed in an orientation in which the upper surface is exposed to the r.f signals from the RFID tag reader. In some cases, this surface is hidden by blocking structural members—such as metal plates—which makes the scanning function difficult or impossible to perform in a reliable manner. This is especially true when the fastener must be installed from the back side of the structure. Thus, when the fastener must be installed from the back side and used in combination with a mating nut installed from the readily accessible front side of the structure, the usefulness of the fastener system is diminished. In addition, when a given fastener is being tightened by the fastener installation tool, the free end of the sensor arm necessarily rotates along with the fastener head portion. If the confronting surface of the workpiece is very rough, the free end of the arm can be damaged or severed, which can interfere with the proper operation of the sensor.

SUMMARY OF THE INVENTION

The invention comprises a washer with intelligent properties which facilitates fastener unit installation and follow-up checking, and an intelligent fastener unit system and method using an intelligent washer which offers all the advantages of the intelligent fastener and overcomes the disadvantages noted above to the installation and follow-on monitoring of structures fastened together using threaded fasteners.

In a broadest aspect, the invention comprises an intelligent washer including a body member having a central aperture for receiving a threaded shank of an associated threaded fastener, a first surface and a second opposite surface. An RFID tag is mounted on the first surface, along with an antenna coupled to the RFID tag. A pressure sensor is mounted on the second surface of the washer body member and is also coupled to the RFID tag. The pressure sensor preferably comprises a variable resistance device whose resistance is a function of applied pressure.

An abutment step is provided on the first surface of the body member extending away from the first surface a sufficient distance for protecting the RFID tag and the antenna during use. The abutment step is formed either as a unitary portion of the body member or a discrete member adhered to the first surface.

The antenna preferably comprises a multi-turn coil which is located on the first surface concentrically of the body member central aperture.

In order to reduce or eliminate completely the generation of eddy currents when the RFID tag is communicating with an associated RFID tag reader, an air gap is formed in the body member extending between the outer periphery and the central aperture of the body member.

The RFID tag has a memory for storing information specific to the washer, and at least some of this information is stored in a section of the memory which is readable by the associated RFID tag reader. Many types of information can be stored in the memory, such as a unique identification for the washer, a torque value specified for the washer, an installation date for the washer, a site location at which the washer is installed, and a date of inspection for the washer.

In a combination aspect, the invention comprises a fastener unit including a fastener having a body member with a head portion and an externally threaded shank portion extending from the head portion;

an internally threaded mating member for receiving the externally threaded shank portion of the fastener; and a washer comprising a body member having a central aperture for receiving the externally threaded shank portion of the fastener, a first surface and a second opposite surface; an RFID tag mounted on the first surface; an antenna mounted on the first surface and coupled to the RFID tag; a pressure sensor, preferably a force sensitive resistor, mounted on the second surface and coupled to the RFID tag; and an abutment step extending away from the first surface a sufficient distance for protecting the RFID tag and the antenna during use. The abutment step may be formed as a unitary portion of the body member or as a discrete member adhered to the first surface of the body member.

For protection against eddy currents, the washer has an air gap formed in the body member extending between the body member periphery and the body member central aperture.

The RFID tag has a memory for storing information specific to the washer, and at least some of this information is stored in a section of the memory which is readable by the associated RFID tag reader. Many types of information can be stored in the memory, such as a unique identification for the washer, a torque value specified for the washer, an installation date for the washer, a site location at which the washer is installed, and a date of inspection for the washer.

The fastener unit is intended for use with an RFID tag reader for interrogating the RFID tag and receiving the information from the RFID tag. The RFID tag reader includes a transmitter for storing information in the memory of the RFID tag and for updating the information stored in the memory of the RFID tag.

The fastener unit is also intended for use with a fastener installation tool for driving the fastener into the internally threaded mating member to a specified torque value. The information noted above typically will include a torque value specified for the fastener unit; and the fastener installation tool includes a torque control unit coupled to the RFID tag reader for limiting the torque applied by the fastener installation tool to the fastener unit to specified torque value Fastener units fabricated according to the invention provide the same advantages over previously known threaded fasteners as the fasteners disclosed and claimed in the '957 patent referenced above. These advantages are as follows. Firstly, initial installation of a fastener unit to the correct torque specification is greatly facilitated by providing the correct torque information in the fastener unit RFID tag in a form which can be extracted by the installation tool when the installer is prepared to install the fastener unit. In addition, the fastener unit can be automatically driven to the proper torque value by the installation tool, and the torque value can be checked immediately after the fastener unit has been installed to ensure that the fastener unit is correctly installed. Moreover, the integrity of the installation of a collection of fastener units can be quickly checked at any time using a scanning inspection technique, and any needed corrective action can be taken using the installation tool. Further, the scanning inspection technique avoids the need to manually check the current value of each installed fastener unit, which substantially reduces the time required for the inspection process to be conducted. Also, the provision of the fastener unit identification, type, specified torque value, site location, installation date and inspection date information in the fastener unit in a form readable by the associated tag reader enables a complete history of the fastener unit installation project to be compiled and saved in a host computer for future maintenance purposes. Lastly, the above advantages are all afforded at relatively low additional cost per fastener unit.

In addition, fastener units with washers having intelligent components incorporating the invention afford additional advantages over the threaded fastener system of the '957 patent. Firstly, the intelligent washer can be positioned on either side of the elements to be assembled together—i.e., either adjacent the internally threaded nut or adjacent the head of the threaded fastener. This positioning versatility ensures that the RFID tag carried by the intelligent washer will be located in an optimum region for communication with the associated tag reader. In addition, the intelligent washer experiences less rotation than the threaded fastener when a fastener unit is being tightened so that the pressure sensor is not subject to the same amount of wear and tear as the sensor arm used in the threaded fastener system of the '957 patent.

For a fuller understanding of the nature and advantages of the invention, reference should be made to the ensuing detailed description taken in conjunction with the accompanying drawings.

DETAILED DESCRIPTION OF THE PREFERRED EMBODIMENTS

Figure 1:
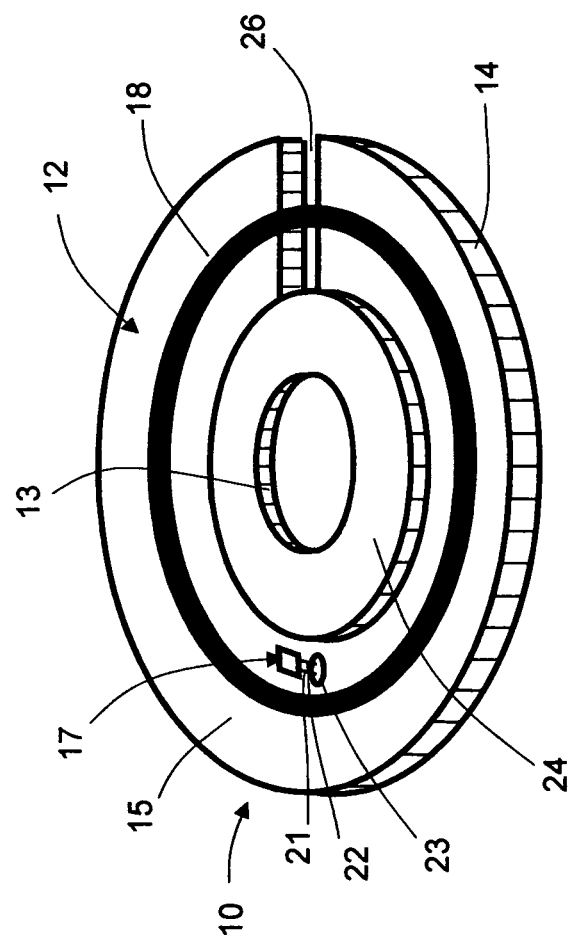
FIG. 1 is a perspective view of a preferred embodiment of a washer with intelligent properties and incorporating the invention.
Figure 2:
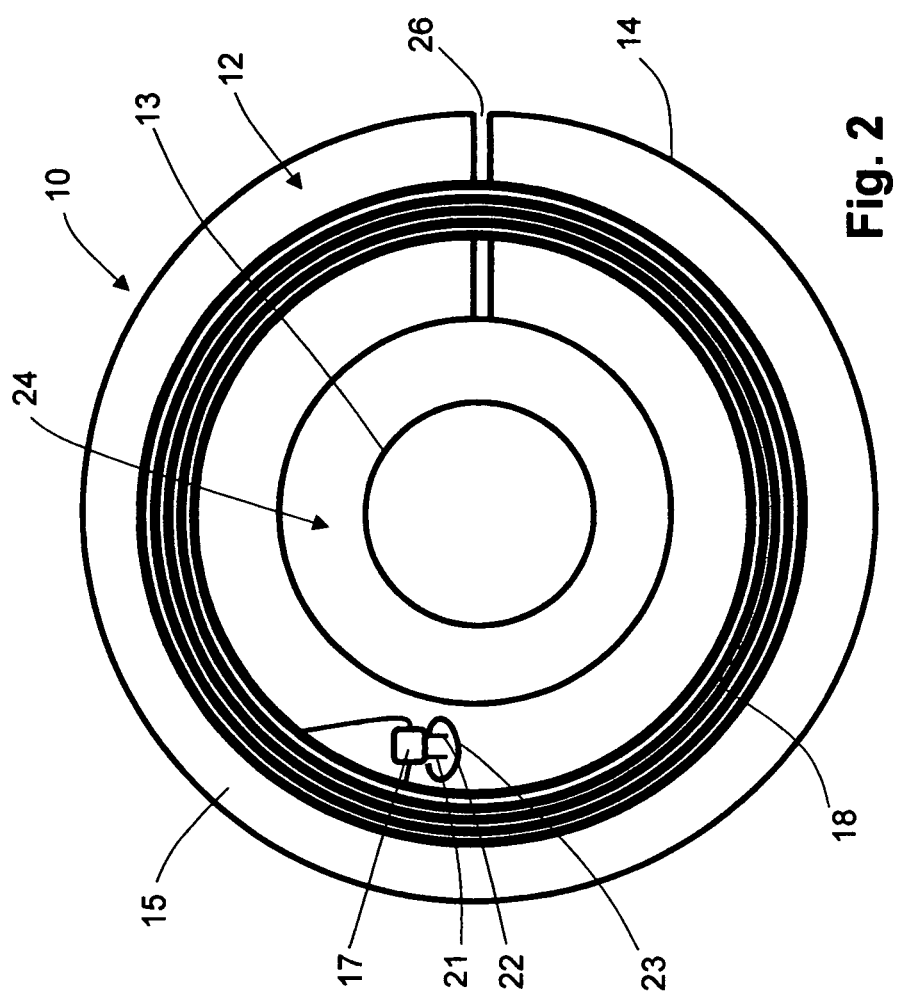
FIG. 2 is a top plan view of the washer of FIG. 1 showing the orientation of the intelligent components.
Figure 3:
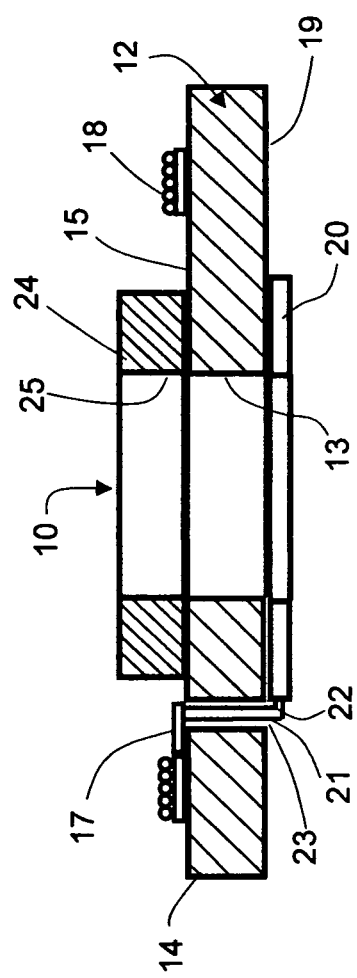
FIG. 3 is a sectional view taken along lines 3-3 of FIG. 2.

Turning now to the drawings, FIGS. 1-3 illustrate a single intelligent washer according to the invention. As seen in these Figs., a washer generally designated with reference numeral 10 has an essentially annular main body portion 12 with a centrally located through aperture 13 and an outer periphery 14. Mounted on a first surface 15 of washer 10 are an RFID chip 17 and a multi-turn air core antenna 18. Mounted on a second surface 19 opposite from first surface 15 is a force sensor 20, which is electrically coupled to the sensor inputs of RFID chip 17 by a pair of conductors 21, 22 routed between sensor 20 and RFID chip 17 through a through aperture 23 formed in main body portion 12 of washer 10 and extending between first surface 15 and second surface 19 (as best shown in FIG. 3). In order to protect RFID chip 17 and antenna 18 from mechanical forces during installation, washer 10 is provided with an annular abutment step 24 which extends away from surface 15. As described more fully below, abutment step 24 functions to absorb any mechanical forces from a confronting fastener head or nut during installation. Abutment step 24 may comprise an integral portion of main body portion 12 or a separate member adhered to first surface 15 of main body portion 12 of washer 10.

The components providing the intelligent properties for washer 10 include RFID chip 17, antenna 18, and sensor 20. RFID chip 17 is a conventional RFID chip commonly referred to in the art as an RFID tag, preferably an Atmel type ATA5570C integrated circuit available from Atmel Corporation of San Jose, Calif., which incorporates the normal components necessary to enable bidirectional communication between the RFID integrated circuit 17 and an associated RFID tag reader via antenna 18. RFID chip 17 further includes a read/write memory section for storing and allowing the retrieval of certain information pertaining to washer 10 in response to interrogation by the associated RFID tag reader. The types of information are described more fully below. In addition, RFID chip 17 incorporates the necessary power transfer circuit components to provide electrical power to the integrated circuit components from electro-magnetic interrogation signals received from the associated RFID tag reader via antenna 18. Since such components are well known, they are not further described in detail to avoid prolixity.

As noted above, sensor 20 is coupled to RFID chip 17 via conductors 21, 22. Sensor 20 is preferably a type SG-1 strain gauge available from Omega Engineering, Inc. of Stamford, Conn. USA. This device exhibits a resistance which varies with the amount of pressure applied to the sensing area. This device be easily attached to second surface 19 of washer 10 using a suitable adhesive. Preferably, the shape of sensor is annular to match the shape of main body portion 12 of washer 10. In use, RFID chip 17 monitors the resistance of sensor 20, and converts these resistance values to torque values, as described more fully below.

In order to reduce the adverse effects of eddy currents in washer 10 when r.f. transmission is conducted between RFID tag 17 and an associated RFID tag reader, an air gap 26 is formed in main body portion 12 of washer 10. This air gap 26 extends between periphery 14 and central aperture 13. If desired, a similar air gap may be formed in abutment step 24.

Figure 4:
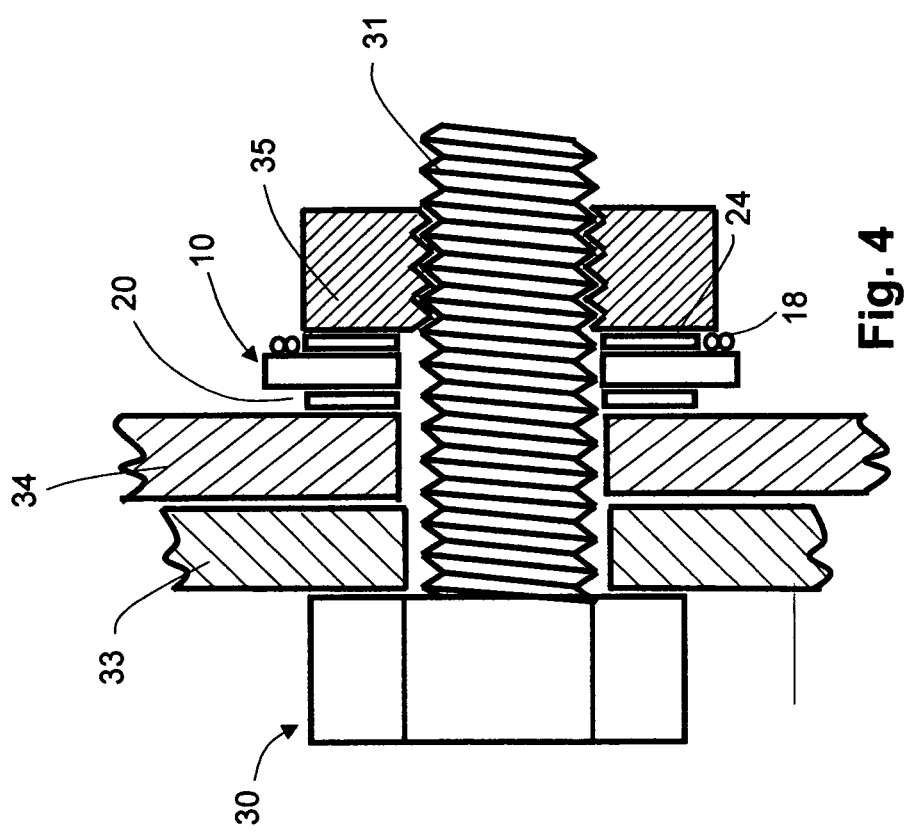
FIG. 4 is a side elevational view partially in section of a fastener unit comprising the washer of FIG. 1 installed in combination with a threaded fastener having a threaded shank portion inserted through aligned apertures in a pair of captured structural members and a mating internally threaded member.

FIG. 4 illustrates a fastener unit comprising a washer 10, a threaded fastener 30 having an externally threaded shank portion 31, and a mating internally threaded nut 35. Threaded fastener 30 is shown inserted through aligned apertures in a pair of captured structural members 33, 34. In the configuration shown in FIG. 4, washer 10 is positioned between the nut 35 and the confronting surface of workpiece 34, with the shank portion 31 of threaded fastener 30 received in the central aperture 13 of washer 10. Sensor 20 thus confronts workpiece 34. Alternatively, washer 10 can be positioned between the head portion of threaded fastener 30 and the confronting surface of workpiece 33, with the shank portion 31 of threaded fastener received in the central aperture 13 of washer 10. In this configuration, sensor 20 confronts workpiece 33. In either configuration, as threaded fastener 30 and nut 35 are mutually tightened, the resistance of sensor 20 varies in accordance with the amount of pressure experienced by sensor 20 due to the changing clamping force provided by threaded fastener 30, washer 10 and nut 35.

In some installations, the nut 35 may be secured to the confronting surface of workpiece 34; in others, the aperture in workpiece 34 may be threaded and function as nut 35. In such installations, it is understood that the threaded aperture of workpiece 34 is considered to form part of a fastener unit comprising the threaded fastener 30, the washer 10 and the threaded aperture of workpiece 34.

As noted above, the fastener unit must be tightened to a specific torque value typically lying within a narrow range established by the project specifications. The current torque value of the fastener unit is signified by the resistance value output by sensor 20. This value is monitored by RFID chip 17. When the resistance value signifies that the specified torque value has been reached, RFID chip 17 generates a signal indicating that the fastener unit is now installed to the specified torque value and further tightening is no longer necessary. In addition, the actual torque value can be stored in the memory of RFID chip 17 for later use. After installation of a fastener unit, the value of the fastener torque can be checked by interrogating RFID tag 17 with the associated RFID tag reader. If the torque has dropped below the lower limit established by the specifications, the resistance value output by sensor 20 will have changed signifying that the fastener unit is no longer within the specified torque range. This change of torque state can be detected by RFID tag 17, stored in memory, and transmitted to the associated RFID tag reader upon interrogation.

Figure 5:
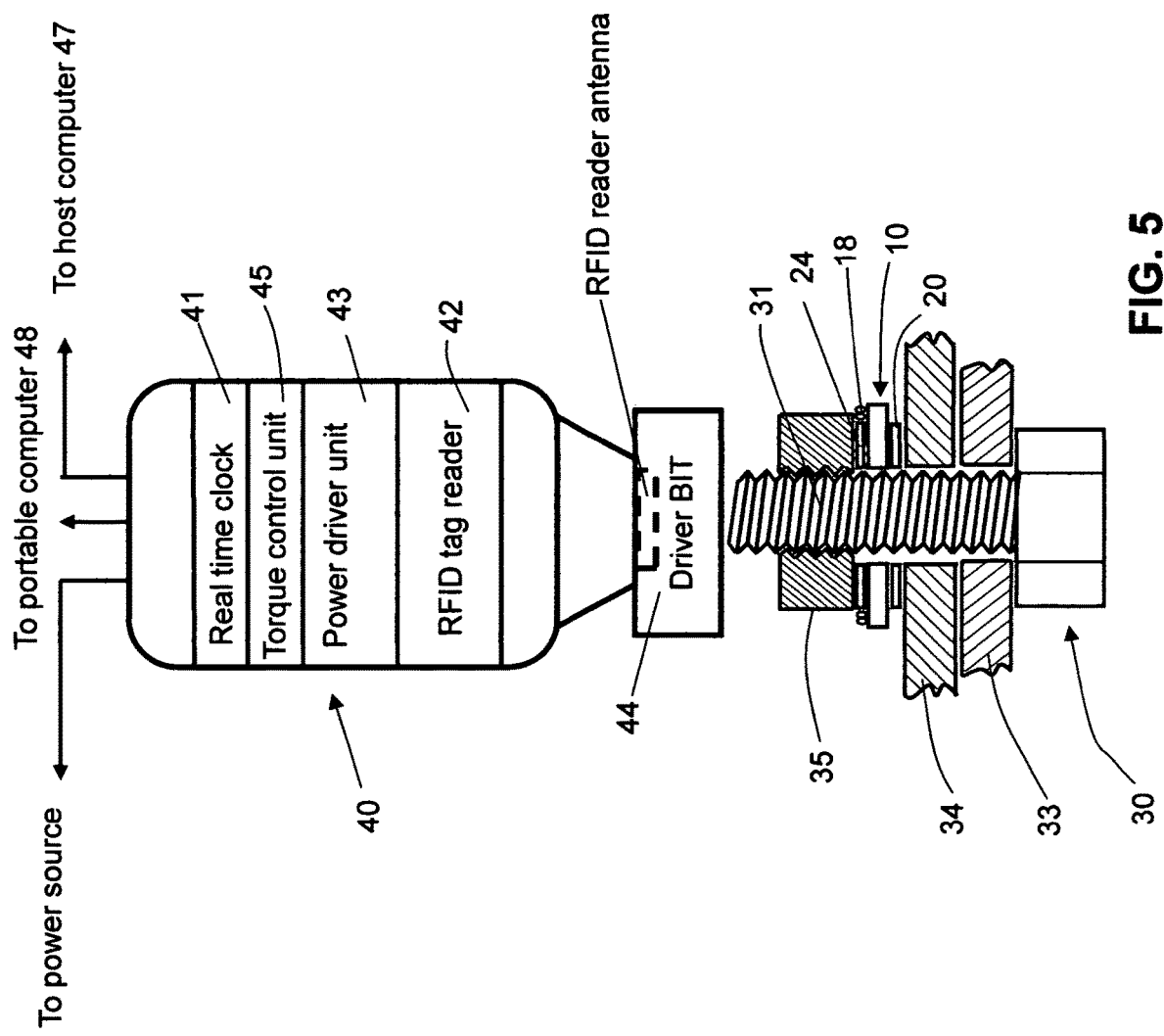
FIG. 5 is a schematic view of a power operated fastener installation tool for use in the installation and torque adjustment of individual fastener units comprising fasteners, internally threaded mating members and intelligent washers.

FIG. 5 is a schematic view of a power operated fastener unit installation tool designated with reference numeral 40 for use in the initial installation of fastener units and later adjustment of fastener units to the proper torque. As seen in this Fig. the tool 40 preferably includes a real time clock 41 for providing real time installation information, an RFID tag reader 42 for reading information from the RFID tag 17 of the washer 10 of a fastener unit to be installed, a power driver unit 43 for providing a driving force to a driver bit 44 used to tighten a fastener 30 or a nut 35, and a torque control unit 45 for controlling the power driver unit 43 in such a manner that the fastener unit is tightened to the specified torque value. Installation tool 40 has a power input and data communication conductors for enabling connection to a host computer 47 and a portable computer 48. Real time clock 41 is a conventional circuit for providing real time information. RFID tag reader 42 is a conventional device capable of generating interrogation signals for specific RFID tags and receiving and processing information received from a responding RFID tag 17. Power driver unit 43 is a conventional electromechanical device used to provide a rotational driving force to driver bit 44. Driver bit 44 is a conventional drive bit having a configuration compatible with the shape of the head of a fastener 30 (e.g., hex head) or a nut 35. Torque control unit 45 is a conventional unit capable of controlling the maximum amount of torque generated by power driver unit 43.

Figure 6:
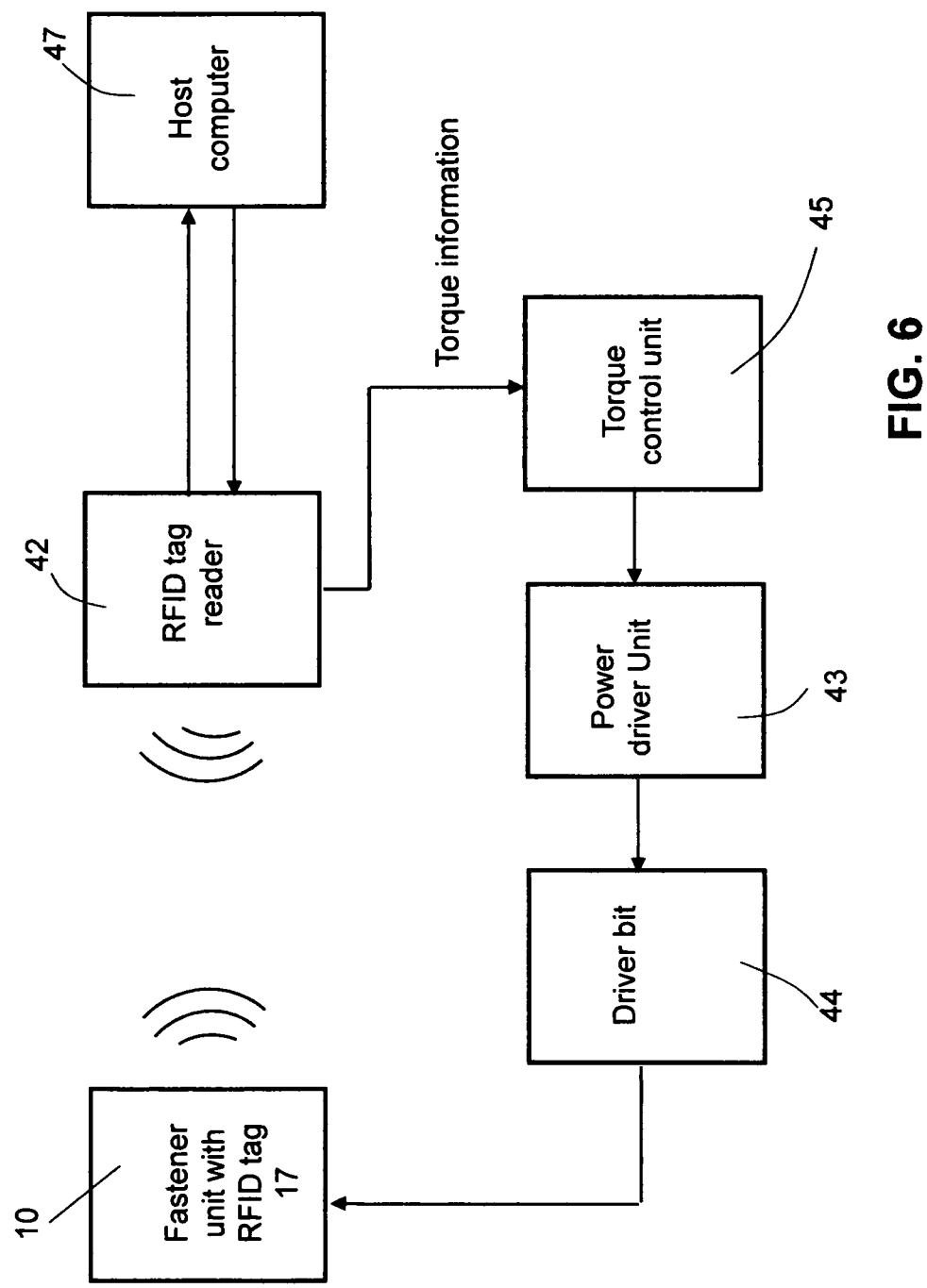
FIG. 6 is a block diagram illustrating the initial installation process for the fastener unit shown in FIG. 4.

FIG. 6 is a block diagram illustrating the use of tool 40 in installing and adjusting the torque setting of a fastener unit. As seen in this Fig., RFID tag reader 42 is placed in the vicinity of and within the reception range of an RFID tag 17. RFID tag reader 42 is then operated to generate an interrogation signal directed to washer 10. Upon receipt of the interrogation signal, RFID tag 17 of washer 10 responds by transmitting the requested information to RFID tag reader 42. RFID tag reader 42 then examines the received information, which will include the unique identification of the washer 10 and the desired torque value for the associated fastener unit. RFID tag reader 42 next supplies the desired torque value to torque control unit 45. When the torque value is received, torque control unit 45 uses this torque value to control the operation of power driver unit 43. Driver bit 44 is maneuvered onto the head of fastener 30 or the nut 35 and power driver unit 43 is activated. As driver bit 44 is rotated by power driver unit 43, fastener 30 and nut 35 are drawn together, thereby drawing the structural members 33, 34 together until torque control unit 45 senses that the torque exerted on the fastener unit has reached the specified value. Operation of the power driver unit 43 is then terminated by the torque control unit 45. RFID tag reader 42 then interrogates RFID tag 17 of washer 10 and transmits the installation date information from real time clock 41 to RFID tag 17, which stores this information in memory.

After initial installation, the actual torque value of the now-installed fastener unit can be checked by operating RFID tag reader 42 to interrogate RFID tag 17 of washer 10. When a response is received by RFID tag reader 42, the received information will include the unique identification of the washer 10, the desired torque value for that fastener unit, and the actual torque value of the fastener unit provided by sensor 20. If the torque value is not correct, the initial installation process can be repeated until the torque value is correct. If the initial installation process fails after one or more attempts, the installer may take elective action to determine the cause of the failure, such as examining the fastener unit and replacing those components found to be defective.

After the installation process has been successfully concluded, the information received by RFID tag reader 42 from RFID tag 17 of the now-installed fastener unit may be transmitted to host computer 47 for further processing and/or storage for later retrieval. This information will normally include the unique identification of the washer 10, the desired torque value, whether the torque value of the fastener unit is within the specification value, the installation date and (optionally) time of day and the site location of the fastener unit. At any stage of the installation process, the information received by RFID tag reader 42 may be transmitted to host computer 47 for further processing and/or storage for later retrieval. Similarly, host computer 47 may send data and instructions to RFID tag reader 42 to update the data in RFID tag 17, perform certain data retrieval operations from RFID tag 17, or take other action such as scanning a collection of RFID tags 17 located in different fastener units.

Figure 7:
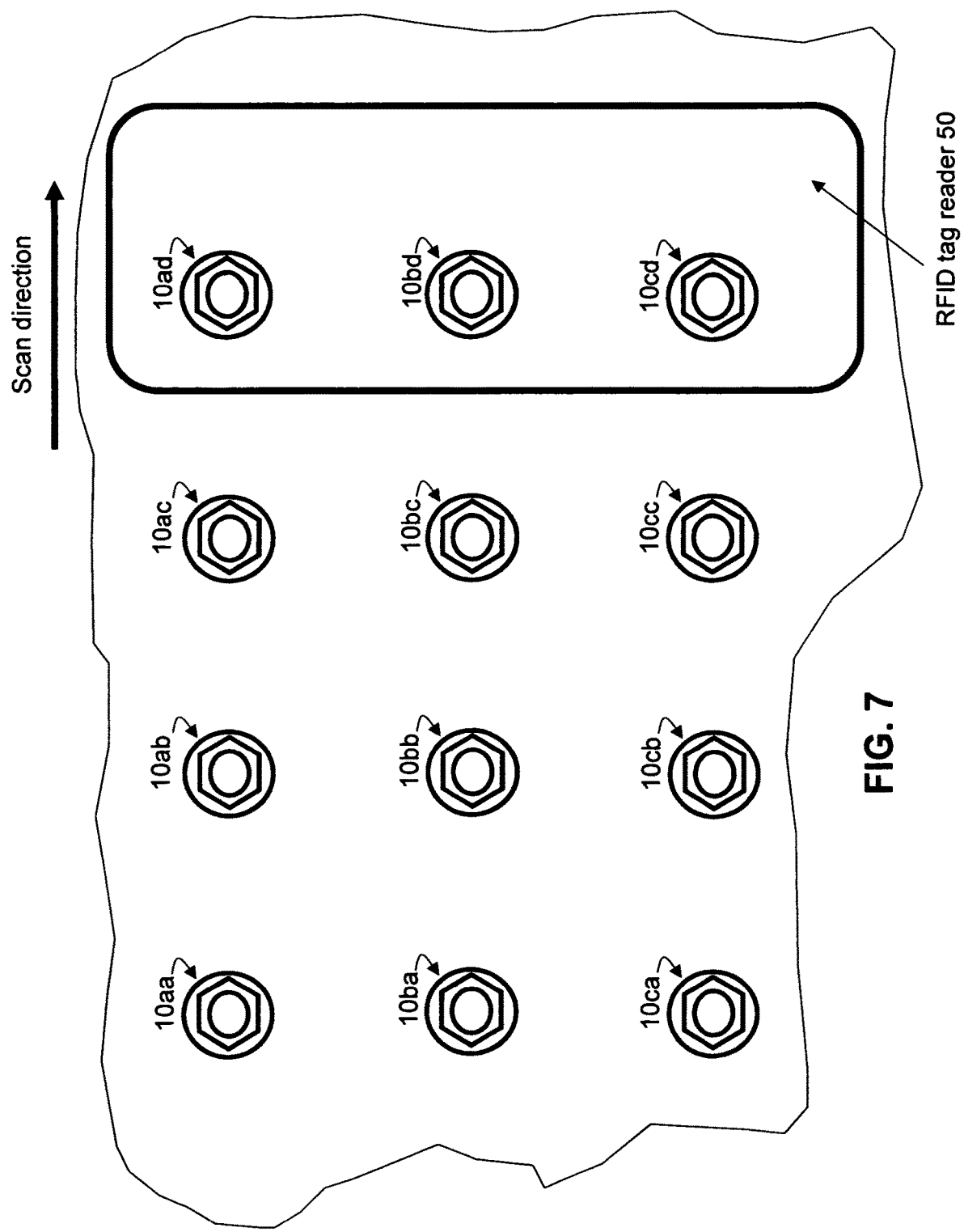
FIG. 7 is a schematic view illustrating a plurality of installed fastener units and the scanning inspection process.

Once a collection of fastener units has been successfully installed, the integrity of the installation can be quickly checked at any time using the scanning inspection technique illustrated in FIG. 7. Normally, this scanning inspection process will be carried out by an inspector having more specialized training than a fastener installer. Also, the first scanning inspection will normally be conducted shortly after the entire installation is completed or the installation of a predetermined set of fasteners has been completed. FIG. 7 illustrates an array of twelve washers 10aa, 10ab, . . . , 10cd each installed at a different location along a structural panel in a configuration as shown in FIG. 4. A portable RFID tag reader 50 having the capability of interrogating the individual RFID tags 17 carried by the individual washers 10aa, 10ab, . . . , 10cd is manually scanned in the desired direction (left-to-right in FIG. 7) across the array. Preferably, RFID tag reader 50 has an antenna defining a transmission/reception area which encompasses a plurality of washers 10aa, 10ab, . . . , 10cd so that several (three in the FIG. 7 embodiment) washers may be scanned at the same time. Each responding washer 10aa, 10ab, . . . , 10cd supplies the requested information to RFID tag reader 50, and this information can be displayed to the inspector using a dedicated display incorporated into the RFID tag reader 50 or a portable computer monitor.

The requested information will normally include the unique identification for each washer responding to the interrogation signals generated by RFID tag reader 50, the physical location of each responding washer on the panel, the value of the torque, and the original installation date. If no response is received to an interrogation of a given washer 10aa, 10ab, . . . , 10cd, this may signify that a fastener unit is currently missing or that the intelligent circuit components are inoperative. Either condition can be fixed at once or at a later scheduled date by simply replacing the missing or inoperative fastener unit having washer 10aa, 10ab, . . . , 10cd. If the information received from a responding washer 10aa, 10ab, . . . , 10cd indicates that the torque is out of specification value, the inspector can use the installation tool 40 described above with reference to FIG. 5 to attempt to correct this problem. All information received by RFID tag reader 50 can be shared with host computer 47 and used for maintenance, history and any other appropriate purposes. RFID tag reader 50 also transmits the inspection date and site location to each successfully interrogated RFID tag 17, which stores this information in memory.

The basic type of information which can be stored in RFID tag 17 in a washer includes the identification of the particular fastener unit, which may be a serial number in a series of numbers or a combination of distinct characters in a collection of characters; the type designation of the fastener unit; the specified torque value for the fastener unit; the installation location of the fastener unit; the original installation date; and the date of the most recent inspection. As will be apparent to those of ordinary skill in the art, other types of information may be also be stored in RFID tag 17 depending on the requirements of a given application.

As will now be apparent, fastener units with washers having intelligent components incorporating the invention as described above afford the same advantages over known threaded fastener arrangements as the intelligent fastener system disclosed and claimed in the above-referenced '957 patent. In particular, initial installation of a fastener unit to the correct torque specification is greatly facilitated by providing the correct torque information in the fastener unit RFID tag in a form which can be extracted by the installation tool when the installer is prepared to install the fastener unit. In addition, the fastener unit can be automatically driven to the proper torque value by the installation tool, and the torque value can be checked immediately after the fastener unit is installed to ensure that the fastener unit is correctly installed. Moreover, the integrity of the installation of a collection of fastener units can be quickly checked at any time using the scanning inspection technique, and any needed corrective action can be taken using the installation tool. Further, the scanning inspection technique avoids the need to manually check the current value of each installed fastener unit, which substantially reduces the time required for the inspection process to be conducted. Also, the provision of the fastener unit identification, type, specified torque value, site location, installation date and inspection date information in the fastener unit in a form readable by the associated tag reader enables a complete history of the fastener unit installation project to be compiled and saved in a host computer for future maintenance purposes. Lastly, the above advantages are all afforded at relatively low additional cost per fastener unit.

In addition, fastener units with washers having intelligent components incorporating the invention as described above afford additional advantages over the threaded fastener system of the '957 patent. Firstly, the intelligent washer can be positioned on either side of the elements to be assembled together—i.e., either adjacent the nut or adjacent the threaded fastener. This positioning freedom ensures that the RFID tag carried by the intelligent washer will be located in an optimum region for communication with the associated tag reader. In addition, the intelligent washer experiences less rotation than the threaded fastener when a fastener unit is being tightened so that the pressure sensor is not subject to the same amount of wear and tear as the sensor arm used in the threaded fastener system of the '957 patent.

Although the above provides a full and complete disclosure of the preferred embodiments of the invention, various modifications, alternate constructions and equivalents will occur to those skilled in the art. For example, while the invention has been described with reference to a specific RFID tag 17, other RFID tags may be used according to the demands of a particular application. In addition, while the preferred torque value sensor has been specifically described, if desired other types of torque sensors may be employed which provide similar variable value measurements such as variable resistance or variable capacitance. Also, while the intelligent washer has been described and illustrated with circular geometry, other shapes—such as elliptical, rectangular and square—may be employed, as desired. Therefore, the above should not be construed as limiting the invention, which is defined by the appended claims.

What is claimed is:
1. An intelligent washer comprising:
   an annular body member having a central through aperture for receiving a threaded shank of an associated threaded fastener, a first surface and a second opposite surface;
   an RFID tag directly mounted on said first surface;
   an antenna directly mounted on said first surface and coupled to said RFID tag;
   a pressure sensor mounted on said second surface and coupled to said RFID tag; and
   an abutment step extending away from said first surface a sufficient distance for protecting said RFID tag and said antenna during use;
   said body member having a periphery and an axial thickness; and further including an air gap formed in said body member as a slot extending entirely through said axial thickness and between said periphery and said central aperture.
2. The invention of claim 1 wherein said antenna comprises a multi-turn coil.
3. The invention of claim 2 wherein said multi-turn coil is located on said first surface concentrically of said central aperture.
4. The invention of claim 1 wherein said abutment step is formed as a unitary portion of said body member.
5. The invention of claim 1 wherein said abutment step is a discrete member adhered to said first surface.
6. The invention of claim 1 wherein said RFID tag has a memory for storing information specific to said washer.
7. The invention of claim 6 wherein least some of said information is stored in a section of said memory which is readable.
8. The invention of claim 6 wherein said information is selected from a group consisting of a unique identification for said washer, a torque value specified for said washer, an installation date for said washer, a site location at which said washer is installed, and a date of inspection for said washer.
9. The invention of claim 1 wherein said sensor comprises a variable resistance strain gauge.
10. A fastener unit comprising:
    a fastener having a body member with a head portion and an externally threaded shank portion extending from said head portion;
    an internally threaded mating member for receiving said externally threaded shank portion of said fastener; and
    a washer comprising an annular body member having a central through aperture for receiving said externally threaded shank portion of said fastener, a first surface and a second opposite surface; an RFID tag mounted directly on said first surface; an antenna mounted directly on said first surface and coupled to said RFID tag; a pressure sensor mounted on said second surface and coupled to said RFID tag; and an abutment step extending away from said first surface a sufficient distance for protecting said RFID tag and said antenna during use;
    said body member having a periphery and an axial thickness; and further including an air gap formed in said body member as a slot extending entirely through said axial thickness and between said periphery and said central aperture.
11. The combination of claim 10 said antenna comprises a multi-turn coil.
12. The invention of claim 11 wherein said multi-turn coil is located on said first surface concentrically of said aperture.
13. The invention of claim 10 wherein said abutment step is formed as a unitary portion of said body member.

14. The invention of claim 10 wherein said abutment step is a discrete member adhered to said first surface.

15. The invention of claim 10 wherein said RFID tag has a memory for storing information specific to said washer.

16. The invention of claim 15 wherein least some of said information is stored in a section of said memory which is readable.

17. The invention of claim 15 wherein said information is selected from a group consisting of a unique identification for said washer, a torque value specified for said washer, an installation date for said washer, a site location at which said washer is installed, and a date of inspection for said washer.

18. The invention of claim 1 wherein said sensor comprises a variable resistance strain gauge.

19. The combination of claim 10 further including an RFID tag reader for interrogating said RFID tag and receiving said information from said RFID tag.

20. The combination of claim 19 wherein said RFID tag reader includes a transmitter for storing information in said memory of said RFID tag.

21. The combination of claim 19 wherein said RFID tag reader includes a transmitter for updating said information stored in said memory of said RFID tag.

22. The combination of claim 19 further including a fastener installation tool for driving said fastener into said internally threaded mating member to a specified torque value.

23. The combination of claim 22 wherein said information includes a torque value specified for said fastener unit; and wherein said fastener installation tool includes a torque control unit coupled to said RFID tag reader for limiting the torque applied by said fastener installation tool to said fastener unit to said torque value.

* * * * *